United States Patent [19]

Takahashi et al.

[11] Patent Number: 4,460,524
[45] Date of Patent: Jul. 17, 1984

[54] METHOD FOR HEATING A RISER OF MOLTEN REFRACTORY MATERIAL

[75] Inventors: Shiro Takahashi, Yokohama; Yoshio Nakagawa, Kasai; Yutaka Hosoda, Takasago, all of Japan

[73] Assignee: Asahi Glass Company Ltd., Tokyo, Japan

[21] Appl. No.: 428,689

[22] Filed: Sep. 30, 1982

[30] Foreign Application Priority Data

Dec. 8, 1981 [JP] Japan .............................. 56-196264

[51] Int. Cl.³ .......................................... B22D 11/16
[52] U.S. Cl. ...................................... 264/26; 264/27; 264/332
[58] Field of Search ............................. 264/26, 332, 27

[56] References Cited

U.S. PATENT DOCUMENTS

| | | | |
|---|---|---|---|
| 1,700,288 | 1/1929 | Fulcher | 264/332 |
| 2,247,318 | 6/1941 | Smythe | 264/332 |
| 2,277,507 | 3/1942 | Benner | 264/332 |
| 3,233,994 | 2/1966 | Penberthy | 264/332 |
| 3,533,905 | 10/1970 | O'Meara | 264/332 |
| 3,593,775 | 7/1971 | Privott | 264/332 |
| 3,867,496 | 2/1975 | Mlavsky | 264/332 |

Primary Examiner—John Parrish
Attorney, Agent, or Firm—Oblon, Fisher, Spivak, McClelland & Maier

[57] ABSTRACT

A method for heating a riser of a molten refractory material in which after a heat molten refractory material is poured into a mold, a melt of the molten refractory material at an upper portion of the mold is directly subjected to induction heating by conducting an electric current by application of an AC voltage at a frequency of from 50 to 1,000 KHz to an induction coil with at least 2 windings around the riser portion containing said melt without induction heating the upper portion of the mold.

6 Claims, 1 Drawing Figure

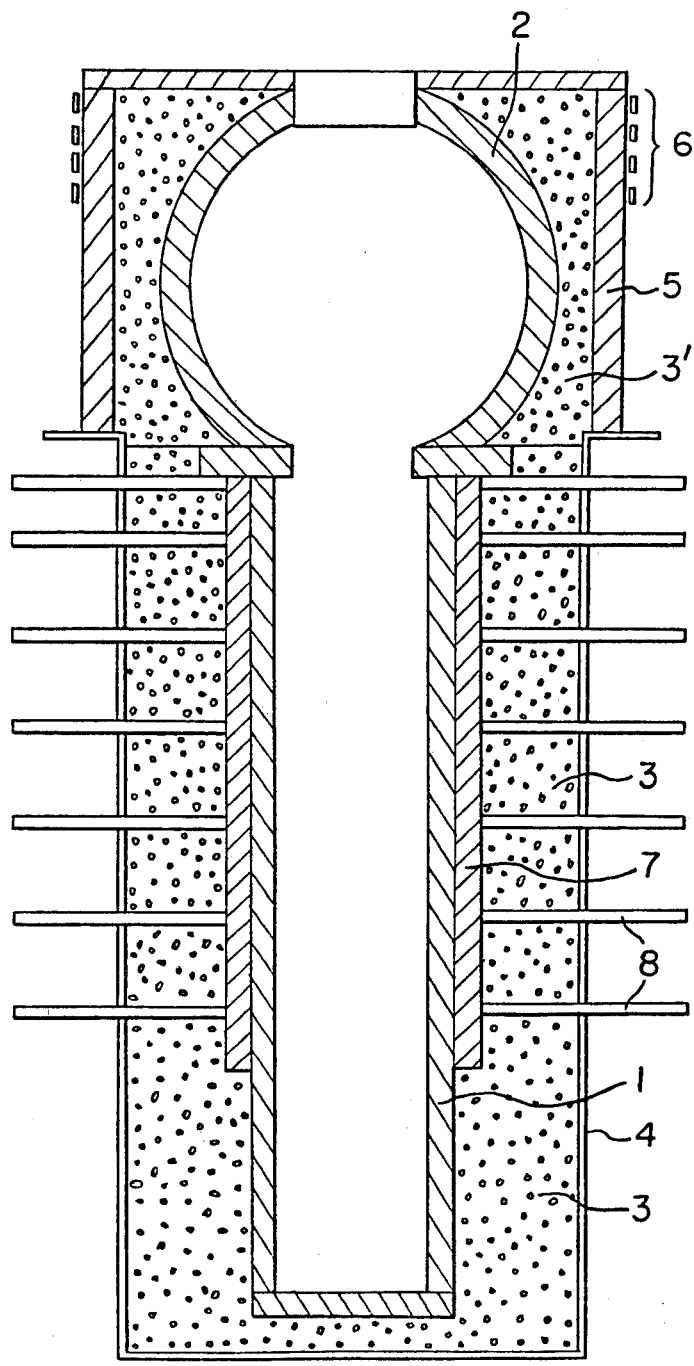
FIGURE

METHOD FOR HEATING A RISER OF MOLTEN REFRACTORY MATERIAL

BACKGROUND OF THE INVENTION

The present invention relates to a method for heating a riser of a molten reflactory material and particularly to such a method which is most suitable to provide a riser effect to obtain a heat fused cast refractory having minimum blow holes.

A heat fused cast refractory is usually prepared by casting a melt obtained by completely melting a refractory material by an electric furnace, in a mold having a predetermined shape followed by solidification and annealing. By virtue of the process, the obtained refractory is highly dense and has superior corrosion resistance and wear resistance, and it is widely used as a high quality refractory.

In the casting of the refractory, the molten refractory material has a high temperature of at least 1,800° C. and when such a melt is poured into a mold, the portion of the melt which is in contact with the mold immediately solidifies and the melt is gradually cooled and solidifies from the outer portion towards the center portion. Accordingly, the outer peripheral portion of the casting which was rapidly cooled has a fine structure since crystals formed there are fine, whereas the inner portion where the cooling is slow and gradual tends to form a coarse crystalline regin, and more importantly, since the difference in density between the molten state and the solid state is so great that the melt undergoes a shrinkage or volume reduction of at least 10% upon solidification, it is difficult to avoid the formation of voids which are commonly referred to as blow holes.

Especially when a refractory having a large size, e.g. having a height of at least 1 m, is to be prepared, it is required to use a mold having a height of from 2.5 to 3 times higher for casting the melt, and the upper portion corresponding to at least ⅔ of the casting thereby obtained will be useless because of the formation of large voids and will have to be cut off from the rest of the casting to obtain a useful cast product.

As the solidification of the poured melt progresses from the periphery towards the center and the temperature of the central portion gradually lowers, the shrinkage takes place and the level of the melt lowers in the mold. If the melt can be supplemented, the formation of voids can be minimized. For this purpose, a riser is often employed in the same manner as in the case of metal casting.

However, in the case of casting a refractory material as opposed to the metal casting, the specific gravity of the melt is small and the melting point is high, and consequently, the cooling is quick and the viscosity tends to be high, whereby the supplement of the melt can not be done smoothly (i.e. the riser is hardly effective) and it is still impossible to avoid the formation of the voids mainly at the font, as mentioned above.

For the riser in refractory casting, it has been common to completely cover the font with a heat insulating material, but such a method is inappropriate or inadequate for heat insulation for a large size casting (see U.S. Pat. Nos. 2,247,318, 2,277,507 and 1,700,288). For instance, in the case of casting a refractory product having a height as high as at least 1 m as mentioned above, the riser portion used to be at best 70% of the mold volume even when attempted to provide a riser effect as great as possible. In the case of cast products of a normal size, the riser is usually from 100 to 150% at best (i.e. a riser portion having a volume of from 1 to 1.5 is required to obtain a cast product having a volume 1). Accordingly, even if the intended cast product is slightly smaller in size than the above mentioned size, the riser effect is at best 50%. Therefore, in order to obtain a large size cast product having minimum voids, at least a half of the casting formed in the mold has to be cut off even when a riser is employed for the casting operation to its maximum effect under the conventional condition.

Further, an attempt has been made to employ arc heating which is practically used in metal casting as an effective method and in which electrodes are dipped in the riser portion for arc heating. However, it has been found that such arc heating can not successfully be applied to the casting of a refractory material. Namely, arc heating by dipping the electrodes in the melt is hardly conducted because of a limited space of the riser portion, and when graphite electrodes are used as the electrodes for arc to cope with the high temperature, the melt will be contaminated with graphite and it is thereby impossible to obtain a normal structure for the product.

SUMMARY OF THE INVENTION

It is an object of the present invention to provide a method whereby even a large size cast refractory may be prepared with a minimum loss of the casting formed in the mold.

The object of the invention can be attained by a method for heating a riser of a molten refractory material in which after a heat molten refractory material is poured into a mold, a melt of the molten refractory material at an upper portion of the mold is subjected to induction heating by conducting an electric current by application of an AC voltage at a frequency of from 50 to 1,000 KHz to an induction coil with at least 2 windings aroung the riser portion containing the melt.

According to the method of the present invention, it is possible that even when the intended cast refractory product has a height of at least 1 m, the useless portion of the casting which has to be cut off is minimized to a level of at most 50% including the riser portion, or to a level of at most 20%, in a certain case at most 10%, of the casting formed in the mold i.e. excluding the riser portion. Further, in many cases, the entire casting formed in the mold is per se useful as a cast product without necessity of cutting off of any portion thereof.

Other objects and features of the present invention will become apparent from the following description of the preferred embodiments.

BRIEF DESCRIPTION OF THE DRAWINGS

FIG. 1 is a vertical cross sectional view of an apparatus for induction heating of the riser to illustrate an embodiment of the present invention.

DETAILED DESCRIPTION OF THE PREFERRED EMBODIMENTS

Now, the present invention will be described in detail with reference to an embodiment illustrated in FIG. 1.

In FIG. 1, reference numeral 1 designates a mold, and reference numeral 2 designates a refractory container constituting a riser portion. The mold is usually surrounded by a heat insulating material 3 and placed in an annealing drum 4 made of metal.

The container 2 constituting the riser portion is likewise surrounded by a packed heat insulating material 3' in the same manner as in the case of the mold. However, an outer back-up wall 5 accommodating the heat insulating material 3' is preferably made of a refractory material. In the present invention, the riser is heated by induction heating, and accordingly, if a metal is used for the outer back-up wall, the heat efficiency for heating the melt tends to be inferior.

According to the present invention, an induction coil 6 is wound around the refractory buck-up wall 5 (or around the container 2 in the case where the riser portion is not surrounded by an insulating material) so that after a molten refractory material is poured into the mold, an induction current is generated in the melt pooled in the riser portion. The coil may be put around the refractory buck-up wall 5 after the molten refractory material has been poured into the mold.

In order to obtain the effect of the present invention with such an apparatus, it is necessary to conduct the induction heating under proper conditions. The conditions necessary for the induction heating are the frequency of the AC voltage applied to the induction coil and the number of windings (i.e. the number of turns) of the coil, substantially irrespective of the configuration or size of the riser portion. It has been found that by specifying these induction conditions, a great power can be generated in the molten refractory material in the riser portion to be heated and the power so generated is effective to heat the entire melt in the riser portion.

Namely, according to the present invention, the induction heating can be applied directly to the entire molten refractory material. It is naturally considered that when a technique of this type is applied to the melt of the molten refractory material having a poor electroconductivity, it would be necessary to incorporate certain electroconductive material into the melt to obtain an adequate induction heating effectiveness. It has unexpectedly been found, however, that the above mentioned direct heating is possible, i.e. without an addition of electroconductive material.

Specifically, the induction heating is conducted under the conditions that the AC voltage is applied as a high frequency wave with a frequency of from 50 to 1,000 KHz and the number of windings of the induction coil is at least 2.

Firstly, with respect to the frequency, it has been confirmed that the power can be generated in the melt even when a high frequency wave having more than 1,000 KHz is applied, but in such a case, the electric current flows only through the surface of the melt and the heating does not reach deep in the melt. On the other hand, when the frequency is less than 50 KHz, the power can penetrate deeply in the melt, but the absolute value of the power which is a function of the frequency, is not adequate to provide sufficient effectiveness for directly heating the melt of the molten refractory material.

A preferred range is from 100 to 600 KHz particularly for the melt system of $ZrO_2$-$Al_2O_3$-$SiO_2$ which will be mentioned hereinafter. Within this range, almost the same effectiveness is obtainable irrespective of other conditions.

With respect to the number of windings of the induction coil, it is usually necessary to provide at least two windings (i.e. two turns) to obtain adequate heating effectiveness although the effectiveness is also depending upon the diameter (or the width) of the coil itself. On the other hand, 10 or more turns may be possible depending upon the compatibility with the high frequency oscillator used. However, in the application to the molten refractory material, the upper limit is usually up to 10 windings to avoid a loss of energy. Particularly preferred is from 3 to 6 windings.

The distance between the adjacent windings of the induction coil is preferably from 30 to 100 mm, more preferably from 40 to 70 mm, as measured from the centers of the respective windings.

In the induction heating of the molten refractory material, particularly when a large size cast refractory having minimum voids is to be prepared according to the present invention, it is preferred, as another relatively important condition for the induction heating, to prolong the time for the induction heating, Specifically the time for the induction heating is preferably from 2 to 20 hours.

As mentioned above, according to the present invention, the number of windings of the induction coil is from 2 to 10 and the distance between the centers of the adjacent windings is from 30 to 100 mm. Practically, however, the height of the container of the riser portion should usually preferably be at least 500 mm. As the time passes, the level of the melt in the riser portion lowers as the melt is gradually introduced into the mold, and consequently the position of the induction coil tends to be dislocated from the position of the melt to be heated. Therefore, it is preferred to lower the location of the windings of the induction coil to which a power is supplied, in correspondence with the lowering of the level of the melt as the time passes.

This can be done either by providing a plurality of induction coils to cover the entire height of the container of the riser portion so that the AC voltage can be applied to each induction coil independently from another, or by adapting an induction coil to be movable so that it can be moved gradually to a lower position as the level of the melt lowers.

In the present invention, such induction conditions have been found during the course of researches to obtain a cast refractory having a melt composition of $ZrO_2$-$Al_2O_3$-$SiO_2$. Accordingly, they are most suitable for the riser of a melt having the below mentioned chemical analytical values. However, such conditions are likewise applicable to a melt having other compositions.

The conditions for the induction heating according to the present invention are most suitably applicable to a melt which has chemical analytical values of from 25 to 50% of $ZrO_2$, from 25 to 70% of $Al_2O_3$ and from 5 to 20% of $SiO_2$ and a total of $ZrO_2$, $Al_2O_3$ and $SiO_2$ being at least 90%, as represented by weight percent upon solidification. Other components are usually $Na_2O$, $Fe_2O_3$, $TiO_2$, etc.

According to the present invention, the direct heating of the melt can extremely effectively be carried out without contamination of the melt and without requiring a large space, and thus the industrial value of the invention is substantial.

Further specific embodiments of the present invention will now be described with reference to the apparatus shown in FIG. 1.

EXAMPLE 1

| | |
|---|---|
| Configuration of the annealing drum 4 | 760 × 1,000 × 1,400 (height) mm |
| Configuration of the mold (sand mold) 1 (inner volume) | 250 × 450 × 1,250 mm |
| Thickness of the mold | 40 mm |
| Configuration of the riser portion (sand mold) (inner volume) | 580 mmφ in diameter and 555 mm in height |
| Thickness of the riser portion | 50 mm |
| Heat insulating material 3' | Packed foamed silica particles |
| Configuration of the back-up outer cylinder (made of alumina-silica type precast refractory) 5 | 780 mmφ in inner diameter (50 mm in thickness) and 600 mm in height |
| Induction coil 6 | 900 mmφ in diameter, the number of windings: 4 turns, and th distance between the centers of the windings: 50 mm |
| Oscillator used: | |
| Input: | 20 KW, output: 10 KW |
| Frequency: | 348 KHz |
| Maximum anode voltage: | 9 KV |
| Maximum anode current: | 1.8 A |
| Size of the cooling plate (graphite) 7 for the control of annealing a plate of 450 × 1,000 mm (35 mm in thickness) | |
| Cooling rods (graphite) 8 for the control of annealing | |
| Configuration | 25 mmφ × 350 mm |
| Number of rods | 4 on one side |
| Distance | 100 mm in a transverse direction and 150 mm in a vertical direction |

With use of an apparatus having the above construction, a melt of an alumina-zirconia-silica type cast refractory (Chemical analytical values in weight percent: 13% of $SiO_2$, 50% of $Al_2O_3$ 33% of $ZrO_2$ and 1.8% of $Na_2O$) which was completely heat-melted by an electric furnace, was poured from the top of the riser portion into the mold, and after filling the mold and introducing a sufficient amount also into the riser portion, the supply of the melt from the electric furnace was stopped.

Twenty minutes after the termination of the supply of the melt (i.e. after the pouring), induction heating was initiated and the power was continuously supplied for about 8 hours although there was certain fractuations. (During this period, the induction coil was stepwisely lowered in its position.)

Thereafter, the casting was left to stand and cool down to room temperature, and 7 days later, the casting was taken out and the results thereby obtained are as follows:

Certain voids were observed at the upper portion, but the entire structure was fine and no substantial coarse region was observed. The entire casting formed in the mold was useful by itself as a final product.

For the purpose of comparison, a casting was prepared without conducting the heating of the riser (i.e. the riser was merely embedded in the heat insulating material), and the structure of the cross sectionally cut surface of the casting thereby obtained was as follows:

Large conical voids called blow holes were present in layers from the top surface of the casting to almost ⅔ of the casting and the entire structure contained many coarse crystalline regions except for the peripheral portion.

EXAMPLE 2

The casting was performed in the same manner as in Example 1 except that the following conditions were employed, whereby substantially the same results as in Example 1 were obtained.

| | |
|---|---|
| Configuration of the riser portion (inner volume) | 500 mmφ in diameter, 400 mm in height and 50 mm in thickness |
| Configuration of the back-up outer cylinder | 700 mmφ in inner diameter, 550 mm in height and 40 mm in thickness |
| Induction coil | 800 mmφ in diameter, the number of windings: 4 turns, and the distance between the centers of the windings: 50 mm |
| Position of the coil | Fixed |
| Frequency of the oscillator used | 420 KHz |
| Size of the graphite cooling plate | 150 × 1,000 mm (35 mm in thickness) |
| Cooling rods | Not used. |

EXAMPLES 3 and 4

The casting was performed in the same manner as in Example 2 except that the frequency was changed to 450 and 550 KHz, respectively, whereby substantially the same results as in Example 2 were obtained.

EXAMPLE 5

The casting was performed in the same manner as in Example 2 except that the number of windings of the coil was 3 turns, whereby substantially the same results as in Example 2 were obtained.

EXAMPLE 6

The casting was performed in the same manner as in Example 1 except that the frequency was changed to 250 KHz, whereby substantially the same results in Example 1 were obtained

We claim:

1. A method for heating a riser of a molten refractory material after a heat molten refractory material is poured into a mold, which comprises directly subjecting a melt of the molten refractory material at a upper portion of the mold to induction heating by conducting an electric current by application of an AC voltage at a frequency of from about 50 to 1,000 KHz to an induction coil with at least two windings around the riser portion containing said melt, without induction heating the upper portion of the mold.

2. The method according to claim 1 wherein the frequency of the applied voltage is from about 100 to 600 KHz and the number of windings of the induction coil is from 2 to 6.

3. The method according to claim 1 or 2 wherein the location of the windings of the coil to which the electric current is conducted, is lowered in correspondence with the lowering of the level of the melt as the melt is gradually introduced from the riser portion into the mold.

4. The method according to any one of claims 1 to 3 wherein the molten refractory material has chemical analytical values of from about 25 to 50% of $ZrO_2$, from about 25 to 70% of $Al_2O_3$ and from about 5 to 20% of $SiO_2$ and a total of $ZrO_2$, $Al_2O_3$ and $SiO_2$ being at least about 90%, as represented by weight percent upon solidification.

5. The method according to claim 1 or 2 wherein the distance between the centers of the adjacent windings of the induction coil is from 30 to 100 mm.

6. The method according to claim 1 or 2 wherein the induction heating is conducted for from 2 to 20 hours.

* * * * *